United States Patent
Nakagawa et al.

(10) Patent No.: US 10,352,431 B2
(45) Date of Patent: Jul. 16, 2019

(54) TRANSMISSION CASE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Hideki Nakagawa, Toyota (JP); Kozo Yamamoto, Nagoya (JP); Hirofumi Nakada, Toyota (JP); Takeo Matsuo, Toyota (JP); Haruki Shirasaka, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/401,750

(22) Filed: Jan. 9, 2017

(65) Prior Publication Data
US 2017/0204960 A1  Jul. 20, 2017

(30) Foreign Application Priority Data
Jan. 15, 2016 (JP) ................... 2016-006171

(51) Int. Cl.
*F16H 57/03* (2012.01)
*F16H 57/021* (2012.01)
*F16H 57/031* (2012.01)
*F16H 57/029* (2012.01)

(52) U.S. Cl.
CPC ......... *F16H 57/021* (2013.01); *F16H 57/029* (2013.01); *F16H 57/03* (2013.01); *F16H 57/031* (2013.01)

(58) Field of Classification Search
CPC ...... F16H 57/021; F16H 57/03; F16H 57/031; F16H 57/029
See application file for complete search history.

(56) References Cited

U.S. PATENT DOCUMENTS

2004/0022466 A1* 2/2004 Deschler ............ F16C 35/00
384/215

FOREIGN PATENT DOCUMENTS

| JP | S56-166350 U | 12/1981 |
|----|--------------|---------|
| JP | H08-025990 A | 1/1996 |
| JP | 2013-194906 A | 9/2013 |

OTHER PUBLICATIONS

Machine Translation of JP 2013-194906, obtained Jan. 6, 2018.*

* cited by examiner

*Primary Examiner* — Richard W Ridley
*Assistant Examiner* — Brian J McGovern
(74) *Attorney, Agent, or Firm* — Oliff PLC

(57) ABSTRACT

The transmission case is provided with a bearing portion having a through hole in which a power transmission shaft is inserted, a fitting portion having a mating surface on which another member is superimposed, a plurality of fastening portions provided in the fitting portion, and ribs provided between the bearing portion and the fastening portions, respectively. The ribs are arranged between the bearing portion and the fastening portions, respectively, the fastening portions being other than the fastening portion that is the closest to the bearing portion amongst the plurality of fastening portions.

4 Claims, 3 Drawing Sheets

TRANSMISSION CASE

INCORPORATION BY REFERENCE

The disclosure of Japanese Patent Application No. 2016-006171 filed on Jan. 15, 2016 including the specification, drawings and abstract is incorporated herein by reference in its entirety.

BACKGROUND

1. Technical Field

The disclosure relates to a transmission case provided in an automatic transmission and so on.

2. Description of Related Art

As disclosed in Japanese Patent Application Publication No. 2013-194906 (JP 2013-194906 A), in an automatic transmission mounted on a vehicle, a transmission is housed inside a transmission case. Also, in the transmission case, a through hole is provided, in which a power transmission shaft is inserted, and a peripheral portion of the through hole is structured as a bearing portion that supports the power transmission shaft so that the power transmission shaft is able to rotate. Further, a transmission cover is attached to the transmission case. To be specific, in outer edge portions of the transmission case and the transmission cover, fitting portions are formed, respectively, each having a flat mating surface. In a plurality of locations in the fitting portions, fastening portions having bolt holes are provided. When attaching the transmission cover to the transmission case, the fitting portions are superimposed on each other, and, in a state where positions of the bolt holes are aligned with one another, bolts are inserted into these bolt holes. Thus, the fitting portions are fastened to each other.

Also, in the power transmission shaft, gears for power transmission are provided. Therefore, the transmission case is required to have high strength in order to be able to endure radial force and thrust force generated when power is transmitted through these gears. In JP 2013-194906 A, ribs are provided between the bearing portion of the transmission case and the plurality of fastening portions in the vicinity of the bearing portion, respectively, thereby giving the transmission case high strength.

SUMMARY

However, with the structure where the ribs are provided between the bearing portion and each of the fastening portions, respectively, as disclosed in JP 2013-194906 A, the following defect could happen.

When those ribs are provided, rigidity of areas where the ribs are provided (rigidity in the longitudinal direction of the ribs) becomes high, and radial force and thrust force are transmitted to the fitting portions more easily through the ribs. Hence, stress increases in the fitting portions of the transmission case, and a gap could be created between the fitting portion of the transmission case and the fitting portion of the transmission cover. In such a situation, a defect such as oil leakage from the transmission case could be caused.

The disclosure has been reached in focusing particularly on the fact that radial force and thrust force transmitted (by the rib) to the fastening portion that is the closest to the bearing portion, amongst the fastening portions, tend to become large.

The disclosure provides a structure of a transmission case that is designed to have high strength by providing ribs, where a gap is restrained from being made in a fitting portion, which fits to another member.

A transmission case according to an aspect of the disclosure is predicated on a transmission case that includes a bearing portion having a through hole in which a power transmission shaft is inserted, a fitting portion having a mating surface on which another member is superimposed, a plurality of fastening portions provided in the fitting portion, and ribs provided between the bearing portion and the fastening portions, respectively. In the transmission case, the ribs are arranged between the bearing portion and the fastening portions other than the fastening portion that is the closest to the bearing portion amongst the plurality of fastening portions.

According to the above aspect, since no rib is provided between the bearing portion and the fastening portion positioned closest to the bearing portion, even when radial force and thrust force from the power transmission shaft are transmitted to the fitting portion through the ribs, the force is restrained from being transmitted to the fastening portion positioned closest to the bearing portion. This means that radial force and thrust force are restrained from being transmitted to the fastening portion, to which such force is transmitted especially easily in the related art (the fastening portion positioned closest to the baring portion). Therefore, it becomes possible to prevent a gap from being made between the fitting portion of the transmission case and the fitting portion of another member. Further, since the ribs are provided between the other fastening portions and the bearing portion, respectively, the ribs enhance rigidity around the bearing portion. Thus, it is possible to ensure strength of the transmission case.

In the disclosure, in the transmission case in which the ribs are provided between the bearing portion and the fastening portions, respectively, the ribs are arranged between the bearing portion and the fastening portions other than the fastening portion that is the closest to the bearing portion amongst the plurality of fastening portions. Therefore, it is possible to restrain radial force and thrust force from being transmitted from the power transmission shaft to the fastening portion that is the closest to the bearing portion. Hence, it becomes possible to prevent a gap from being made between the fitting portion of the transmission case and a fitting portion of another member, thus avoiding defects such as oil leakage. Also, since the ribs are provided between the other fastening portions and the bearing portion, respectively, it is possible to ensure strength of the transmission case.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the disclosure is explained based on the drawings. The embodiment explains a case where the disclosure is applied to a transmission case for an automatic transmission mounted on a vehicle.

Figure 1:
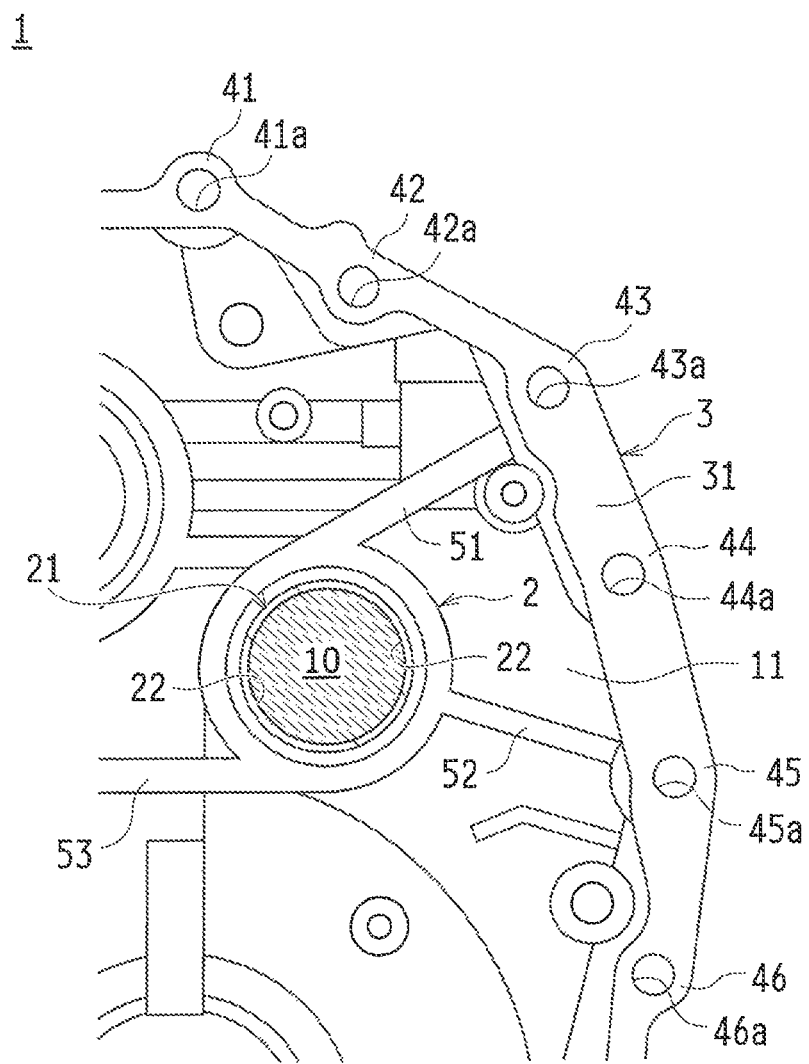
FIG. 1 is a view of a part of a transmission case.

FIG. 1 is a view showing a part of a transmission case 1 according to the embodiment. As shown in FIG. 1, the transmission case 1 includes a bearing portion 2, a fitting portion 3, a plurality of fastening portions 41 to 46, and a plurality of ribs 51, 52.

The bearing portion 2 is formed integrally with a vertical wall 11 of the transmission case 1, and has a shape projecting cylindrically from a surface of the vertical wall 11. In the center of the bearing portion 2, a through hole 21 is formed, in which a power transmission shaft (not shown) is inserted. On an inner surface of the through hole 21, metal bearings 22 are arranged, which support the power transmission shaft so that the power transmission shaft is able to rotate.

The fitting portion 3 has a mating surface 31 on which a transmission cover 6 (see FIG. 2) is superimposed. The fitting portion 3 is formed into a given shape that structures an outer edge of the transmission case 1. The mating surface 31 of the fitting portion 3 is entirely formed of a flat surface. A fitting portion 61 (see FIG. 2) formed in an outer edge of the transmission cover 6 has a shape that generally matches the shape of the outer edge of the transmission case 1. A mating surface of the fitting portion 61 of the transmission cover 6 is also entirely formed of a flat surface.

The fastening portions 41 to 46 are formed at a plurality of locations in the fitting portion 3. In the fastening portions 41 to 46, bolt holes 41a to 46a are formed in order to fasten the transmission cover 6 by using bolts. In a plurality of locations in the fitting portion 61 of the transmission cover 6, similar bolt holes are formed corresponding to the bolt holes 41a to 46a.

The characteristic of the embodiment is the positions where the ribs 51, 52 are arranged.

Specifically, the ribs 51, 52 are arranged between the bearing portion 2 and the fastening portions 43, 45 other than the fastening portion 44 that is the closest to the bearing portion 2 amongst the plurality of fastening portions 41 to 46.

To be more specific, the transmission case 1 according to the embodiment includes the first rib 51 and the second rib 52. The first rib 51 is provided between the bearing portion 2 and the fastening portion 43 located on the upper side next to the fastening portion 44 that is positioned closest to the bearing portion 2. The second rib 52 is provided between the bearing portion 2 and the fastening portion 45 located on the lower side next to the fastening portion 44 that is positioned closest to the bearing portion 2. In other words, the ribs 51, 52 extend from the bearing portion 2 to the fitting portion 3, the plurality of fastening portions 41 to 46 includes a first group of fastening portions 43, 44 and 45 with:1 a closest fastening portion 44 that is closest to the bearing portion 2 than other fastening portions 41-43, 45 and 46 of the plurality of fastening portions 41 to 46 and (2) a pair of fastening portions 43 and 45 adjacent to the closest fastening portion 44, and in the first group of fastening portions 43, 44 and 45, only the pair of fastening portions 43 and 45 includes a respective rib 51 or 52 of the plurality of ribs 51 and 52 that extends to the bearing portion 2.

As stated above, the ribs 51, 52 are arranged only between the bearing portion 2 and the fastening portions 43, 45, respectively. The fastening portions 43, 45 are located next to the fastening portion 44 such that the fastening portion 44 is sandwiched between the fastening portions 43, 45 from the upper side and the lower side, respectively, the fastening portion 44 being positioned closest to the bearing portion 2.

Each of the ribs 51, 52 is formed integrally in the vertical wall 11 of the transmission case 1, and has a shape projecting from a surface of the vertical wall 11. Projection dimensions of the ribs 51, 52 from the surface of the vertical wall 11 coincide with a projection dimension of the bearing portion 2 (the projection dimension from the surface of the vertical wall 11). Therefore, an end surface of the bearing portion 2 (the end surface on the front side in FIG. 1) and end surfaces of the ribs 51, 52 (the end surfaces on the front side in FIG. 1) produce a flush surface.

Figure 2:
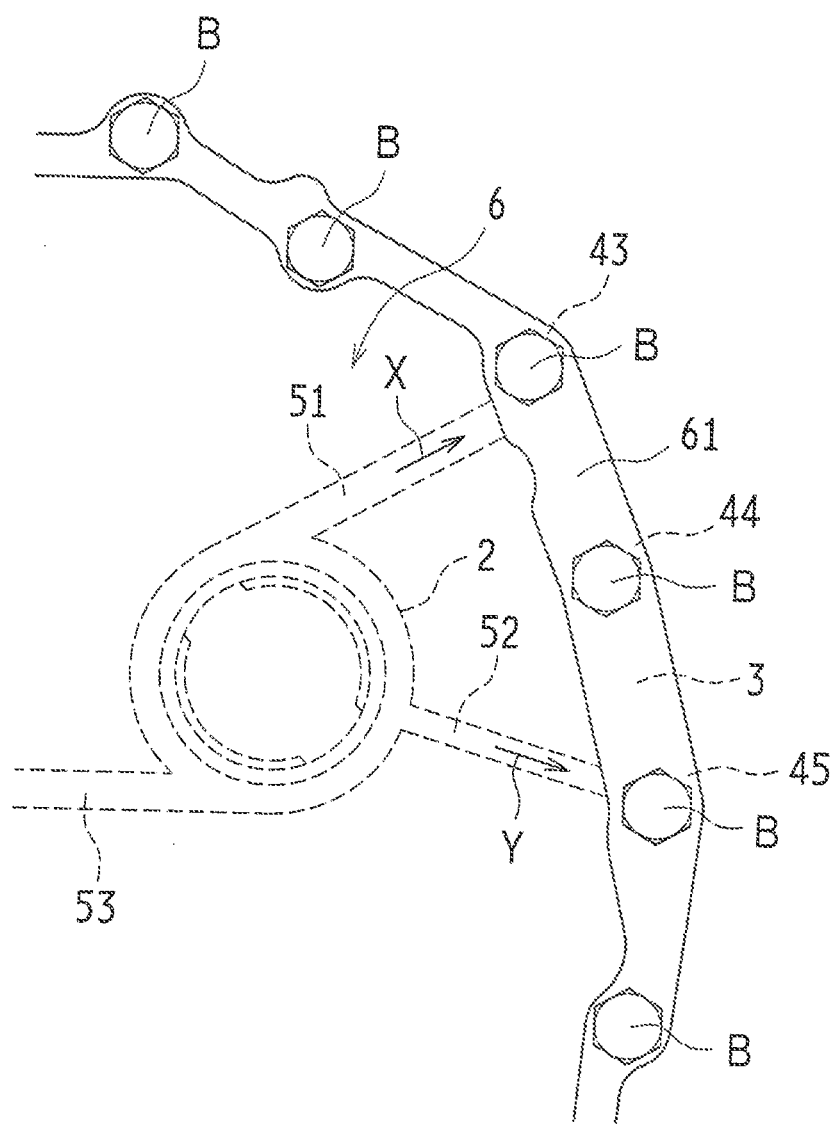
FIG. 2 is a view of a state where a transmission cover is attached to the transmission case, explaining a state where radial force and thrust force are transmitted from a power transmission shaft.

Next, a work for attaching the transmission cover 6 to the transmission case 1 is explained. In the attaching work, as shown in FIG. 2, the fitting portion 61 of the transmission cover 6 is superimposed on the fitting portion 3 of the transmission case 1, and positions of the bolt holes 41a to 46a formed in the fitting portions 3, 61, respectively, are aligned with each other. In this state, bolts B, B . . . are inserted in the bolt holes 41a to 46a, and the fitting portions 3, 61 are thus fastened to each other.

Another rib 53 is also connected with the bearing portion 2. The rib 53 is arranged between the bearing portion 2 and another bearing portion (not shown), and contributes to ensuring strength of the transmission case 1.

Next, an effect of the embodiment is explained. As stated earlier, the ribs 51, 52 are arranged in the fastening portions 43, 45, respectively, other than the fastening portion 44 that is the closest to the bearing portion 2 amongst the plurality of fastening portions 41 to 46. This means that no rib is provided between the fastening portion 44, which is positioned closest to the bearing portion 2, and the bearing portion 2. Hence, even when radial force and thrust force from the power transmission shaft are transmitted to the fitting portion 3 through the ribs 51, 52 (see arrows X, Y in FIG. 2), transmission of such force to the fastening portion 44, which is the closest to the bearing portion 2, is prohibited. This means that radial force and thrust force are restrained from being transmitted to the fastening portion, to which such force is transmitted especially easily in the related art (the fastening portion 44 closest to the bearing portion 2). Therefore, it becomes possible to prevent a gap from being made between the fitting portion 3 of the transmission case 1 and the fitting portion 61 of the transmission cover 6, thus avoiding defects such as oil leakage. Also, since the ribs 51, 52 are provided between the other fastening portions 43, 45 and the bearing portion 2, respectively, the ribs 51, 52 enhance rigidity around the bearing portion 2. Thus, it is possible to ensure strength of the transmission case 1.

As stated so far, with the structure according to the embodiment, it is possible to achieve both effects of preventing oil leakage and ensuring strength of the transmission case 1, and it is thus possible to provide the transmission case 1 having good mass effectiveness.

Figure 3:
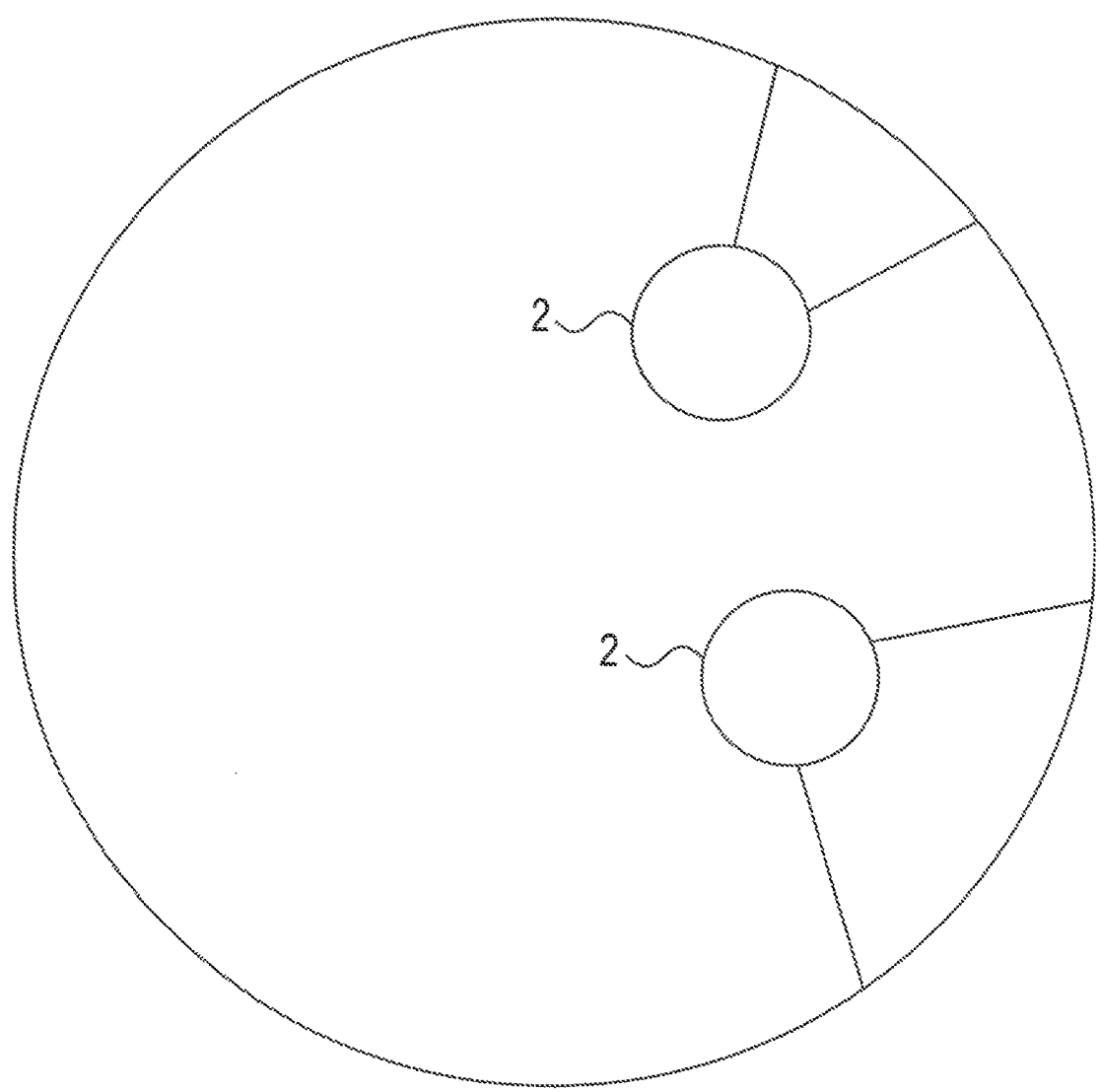
FIG. 3 is a schematic view of the transmission case, which is a schematic representation that is not indicative of specific shapes and sizes of the components relative to each other.

In the foregoing embodiment, a case was explained where the disclosure is applied to one of the bearing portions 2 of the transmission case 1. The disclosure is not limited to this, and the disclosure may be applied to each of the plurality of bearing portions if there are more than one bearing portions in the transmission case 1. This means that the ribs are arranged between each of the bearing portions and the fastening portions other than the fastening portion that is the closest to each of the bearing portions, respectively. For example, as illustrated by FIG. 3, a number of the bearing portion 2 is more than one, the plurality of fastening portions includes a respective group of fastening portions for each bearing portion 2, the respective group of fastening portions for each bearing portion 2 includes: (1) a respective closest fastening portion that is closest to the respective bearing portion 2 than other fastening portions of the plurality of fastening portions and (2) a respective pair of fastening portions adjacent to the respective closest fastening portion, and in the respective group of fastening portions for each bearing portion 2, only the respective pair of fastening portions includes a respective rib of the plurality of ribs that extends to the respective bearing portion 2.

In the embodiment described above, the ribs 51, 52 are arranged only between the bearing portion 2 and the fastening portions 43, 45, respectively, and the fastening portions 43, 45 are located next to the fastening portion 44 such that the fastening portion 44 is sandwiched between the fastening portions 43, 45 from the upper and lower sides, respectively, the fastening portion 44 being the closest to the bearing portion 2. The disclosure is not limited to this, and the ribs may be arranged at arbitrary positions between the bearing portion 2 and fastening portions other than the fastening portion 44 that is the closest to the bearing portion 2. For example, the ribs may be arranged between the bearing portion 2 and all of the fastening portions other than the fastening portion 44 that is the closest to the bearing portion 2.

In the foregoing embodiment, a case was explained where the disclosure is applied to one of the bearing portions 2 of the transmission case 1. The disclosure is not limited to this, and the disclosure may be applied to each of the plurality of bearing portions if there are more than one bearing portions in the transmission case 1. This means that the ribs are arranged between each of the bearing portions and the fastening portions other than the fastening portion that is the closest to each of the bearing portions, respectively.

The disclosure may be applied to a transmission case that is able to both prevent oil leakage and ensure strength.

What is claimed is:

1. A transmission case, comprising:
a bearing portion having a through hole in which a power transmission shaft is inserted;
a fitting portion having a mating surface on which another member is superimposed;
a plurality of fastening portions provided in the fitting portion, wherein the plurality of fastening portions includes all fastening portions in the mating surface of the fitting portion; and
a plurality of ribs,
wherein each of the plurality of ribs extends from the bearing portion to the fitting portion,
wherein the plurality of fastening portions includes a first group of fastening portions with: (1) a closest fastening portion that is closest to the bearing portion than other fastening portions of the plurality of fastening portions and (2) a pair of fastening portions adjacent to the closest fastening portion, and
wherein, in the first group of fastening portions, only each of the pair of fastening portions includes a respective rib of the plurality of ribs that extends to the bearing portion.

2. The transmission case according to claim 1, wherein the fitting portion is formed into a given shape that structures an outer edge of the transmission case, and the mating surface is entirely formed of a flat surface.

3. The transmission case according to claim 1, wherein the plurality of ribs are formed integrally with a vertical wall included in the transmission case, and a respective projection dimension of each of the plurality of ribs from a surface of the vertical wall coincide with a projection dimension of the bearing portion from the surface of the vertical wall.

4. The transmission case according to claim 1, wherein a number of the bearing portion is more than one,
wherein the plurality of fastening portions includes a respective group of fastening portions for each bearing portion, the respective group of fastening portions for each bearing portion includes: (1) a respective closest fastening portion that is closest to the respective bearing portion than other fastening portions of the plurality of fastening portions and (2) a respective pair of fastening portions adjacent to the respective closest fastening portion, and
wherein, in the respective group of fastening portions for each bearing portion, only each of the respective pair of fastening portions includes a respective rib of the plurality of ribs that extends to the respective bearing portion.

* * * * *